3,580,742
SEPARATOR-ELECTROLYTE CARRIER FOR PRIMARY CELLS

Viktor Arsenievich Naumenko, Novoslobodskaya ul. 62, kv. 64; Tatiana Nikolaevna Toroptseva, 3 Mytischinskaya ul. 14-a, kv. 109; Lidia Fedorovna Penkova, 3 Mytischinskaya ul. 14-a, kv. 124; Andrei Akimovich Vyselkov, Murmansky proezd 6, kv. 27; and Galina Ivanovna Rogova, Prospekt Mira 169, kv. 12, all of Moscow, U.S.S.R.
No Drawing. Filed Jan. 11, 1968, Ser. No. 697,001
Int. Cl. H01m 11/00
U.S. Cl. 136—155                                     3 Claims

ABSTRACT OF THE DISCLOSURE

A separator-electrolyte carrier for wet primary cells activated by water or electrolyte solutions, made of a cellulosic material impregnated by an aqueous solution, ensuring a rapid activation of the cells and increasing their service life; said separator can be used in all cases where the above properties are of importance, for instance, in cells for rescue operations.

---

The present invention relates to separators-electrolyte carriers for primary wet cells.

Cellulosic materials are well-known and widely used for making interelectrode separators-electrolyte carriers in primary wet cells which are activated by water or electrolyte solutions.

Such a separator, however, fails to meet the requirements imposed on primary wet cells as to the full operation attainment (activation time) and the service life due to a considerable resistance of the separator and insufficient moisture retention with time.

It is an object of the present invention to eliminate the above disadvantages.

It is a more specific object of the invention to provide an interelectrode separator-electrolyte carrier noted for its high rate of water absorption and a good electric conductivity this being conducive to considerably shortening the activation time of cells, the sufficient water retentivity of the separator being instrumental in prolonging the service life of such cells when the latter operate after the discharge of excess water.

This object is accomplished by impregnating sheets of cellulosic material with an aqueous solution of potassium chloride, starch and glycerol or urea. It is expedient, that for every 100 parts by weight of dry cellulosic material the above substances should be taken in the following proportions:

Potassium chloride—2 to 8 percent
Glycerol or urea—0.2 to 3.5 percent
Starch—0.2 to 0.8 percent Given hereinbelow is a detailed description of the present invention.

A separator-electrolyte carrier is manufactured by impregnating sheets of cellulosic material with an aqueous solution containing potassium chloride, starch and glycerol or urea. Depending on the specific tasks that the primary cell is to fulfill, the percentage of the above components may be varied. The most favorable results as to the rate of absorption and water retention can be obtained with a separator made of alignine a cellulosic material treated with an aqueous solution containing 10 percent of potassium chloride, 5 percent of glycerol and 2 percent of starch.

Said solution in an amount of 30–40 ml. is applied to each sheet of cellulosic material 60 x 70 cm. in size by means of an atomizer or a dye sprayer. In the course of treatment the sheets are placed one atop the other. The number of sheets depends on the required thickness of the separator. An untreated sheet is placed onto the upper treated one, whereupon the entire pile of sheets is subjected to rolling to effect cementing, and then dried.

The separator is dried at a temperature not above +35° C. for 24 hours so that the moisture content does not go over 6 percent. In case the moisture content happens to be higher than specified, the separator is subjected to an additional drying at a temperature not above +50° C. for 2 to 5 hours.

After drying the separator is cut into cards of the required size.

An advantage of the separator-electrolyte carrier proposed herein resides in that the presence of potassium chloride in the separator increases the electric conductivity of the water absorbed by the separator and lowers the temperature of water freezing, this being especially important when activating primary cells whose initial negative temperature is as low as −50° C. Glycerol or urea increase the rate of absorption (capillarity) of the separator. When the separator is brought into contact with water or an electrolyte solution, the liquid ascends along the separator as high as 2 to 3 cm. in one or two seconds and as high as 5 cm. in 10 to 15 sec. These characteristics vary insignificantly when the temperature drops to values close to the freezing point of water or the electrolyte solution.

The presence of both potassium chloride and glycerol or urea in the separator results in a considerable reduction of the activation time of primary cells. Thus, the activation time of primary cells whose initial temperature is −50° C., with the use of a separator obtained by the method of the invention is reduced to 6–8 min. as compared to the convention period of 18–20 min.

The presence of starch in the separator contributes to the retention of moisture (water) in the cell, whereby the service life of the cell becomes almost twice as long as in conventional cells.

What is claimed is:

1. A separator-electrolyte carrier for wet primary cells activated by water or electrolyte solutions, said separator-electrolyte carrier being constituted by a sheet of a cellulosic material impregnated with an aqueous solution containing potassium chloride for increasing the electrical conductivity of water, starch which aids in retaining water in the separator and a substance selected from the group consisting of glycerol and urea for increasing the rate of water absorption by the separator.

2. A separator-electrolyte carrier according to claim 1, wherein said substance is glycerol and for 100 parts by weight of dry cellulosic material there are taken:

Potassium chloride—2 to 8 percent
Glycerol—0.2 to 3.5 percent
Starch—0.2 to 0.8 percent.

3. A separator-electrolyte carrier as claimed in claim 1, wherein said substance is urea and for 100 parts by weight of dry cellulosic material there are taken:

Potassium chloride—2 to 8 percent
Urea—0.2 to 3.5 percent
Starch—0.2 to 0.8 percent.

References Cited
UNITED STATES PATENTS

| | | | |
|---|---|---|---|
| 215,899 | 3/1879 | Ehrenberg | 136—154 |
| 350,294 | 10/1886 | Cox | 136—157 |
| 395,706 | 1/1889 | Kitsee | 136—155 |
| 1,011,485 | 12/1911 | Pfleiderer | 136—157 |
| 2,200,301 | 5/1940 | Ruben | 136—154UX |
| 2,330,607 | 9/1943 | Muller et al. | 136—157 |
| 3,057,760 | 10/1962 | Dereska et al. | 136—137 |

DONALD L. WALTON, Primary Examiner

U.S. Cl. X.R.

136—157